United States Patent
Kuriki

(10) Patent No.: US 8,960,662 B2
(45) Date of Patent: Feb. 24, 2015

(54) IMAGE READING APPARATUS

(71) Applicant: Brother Kogyo Kabushiki Kaisha, Nagoya-shi, Aichi-ken (JP)

(72) Inventor: Yuichiro Kuriki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/040,457

(22) Filed: Sep. 27, 2013

(65) Prior Publication Data
US 2014/0103598 A1    Apr. 17, 2014

(30) Foreign Application Priority Data

Oct. 12, 2012    (JP) ................................ 2012-227354

(51) Int. Cl.
*B65H 83/00*    (2006.01)
*B65H 5/26*    (2006.01)
(Continued)

(52) U.S. Cl.
CPC .. *B65H 5/26* (2013.01); *B65H 1/06* (2013.01); *B65H 5/062* (2013.01); *H04N 1/00588* (2013.01); *H04N 1/00655* (2013.01); *H04N 1/00806* (2013.01); *H04N 1/2032* (2013.01); *H04N 1/00702* (2013.01); *H04N 1/00732* (2013.01); *H04N 1/00745* (2013.01); *H04N 1/00782* (2013.01); *H04N 1/12* (2013.01); *H04N 1/193* (2013.01); *B65H 2402/441* (2013.01);
(Continued)

(58) Field of Classification Search
CPC ............... B65H 2403/30; B65H 5/062; B65H 2407/21; B65H 2301/4454; G03G 2215/00392; G03G 15/6514

USPC .......... 271/3.14, 4.04, 9.06, 9.09, 9.13, 10.04
See application file for complete search history.

(56) References Cited

U.S. PATENT DOCUMENTS 5,513,017 A    4/1996 Knodt et al.
6,088,135 A    7/2000 Kusumoto
(Continued)

FOREIGN PATENT DOCUMENTS

JP    H09-284478 A    10/1997
JP    2005-051313 A    2/2005
(Continued)

OTHER PUBLICATIONS

Machine translation of JP 9-284478, retrieved Apr. 5, 2012.*
(Continued)

*Primary Examiner* — Michael McCullough
(74) *Attorney, Agent, or Firm* — Banner & Witcoff, Ltd.

(57) ABSTRACT

An image reading apparatus, which includes a housing including a first housing and a second housing; a first opening located in between the first housing and the second housing; a second opening formed to communicate with the first opening through a first path; a third opening, a length of which along the first direction is smaller than a length of the first opening; a fourth opening, including a part of the second opening, formed to communicate with the third opening through a second path; a fifth opening located in a position where a part of the second path and the first path merge with each other; an image reader; a first roller exposed to a part of the first path ranging between the image reader and the fifth opening; and a second roller exposed to a part of the second path ranging between the third opening and the fifth opening, is provided.

20 Claims, 7 Drawing Sheets

(51) Int. Cl.
*B65H 1/06* (2006.01)
*B65H 5/06* (2006.01)
*H04N 1/00* (2006.01)
*H04N 1/203* (2006.01)
*H04N 1/12* (2006.01)
*H04N 1/193* (2006.01)

(52) U.S. Cl.
CPC ......... *B65H 2402/46* (2013.01); *B65H 2403/42* (2013.01); *B65H 2403/92* (2013.01); *B65H 2404/611* (2013.01); *B65H 2405/324* (2013.01); *B65H 2407/21* (2013.01); *B65H 2511/415* (2013.01); *B65H 2513/42* (2013.01); *B65H 2701/1914* (2013.01); *B65H 2801/39* (2013.01); *H04N 2201/0081* (2013.01)
USPC ..................................... 271/3.14; 271/9.13

(56) References Cited

U.S. PATENT DOCUMENTS

| | | | |
|---|---|---|---|
| 6,665,098 | B1 | 12/2003 | Nagarajan |
| 7,561,313 | B2 | 7/2009 | Endo |
| 7,872,783 | B2 | 1/2011 | Kitagawa et al. |
| 7,913,994 | B2 | 3/2011 | Morikawa et al. |
| 7,954,803 | B2 | 6/2011 | Kitagawa et al. |
| 8,333,377 | B2 | 12/2012 | Kohyama |
| 8,371,573 | B2 | 2/2013 | Morikawa et al. |
| 8,675,264 | B2 | 3/2014 | Olsen |
| 8,705,150 | B2 | 4/2014 | Shirai et al. |
| 2005/0057785 | A1 | 3/2005 | Endo |
| 2008/0259414 | A1 | 10/2008 | Kitagawa et al. |
| 2008/0285097 | A1 | 11/2008 | Kitagawa et al. |
| 2012/0105925 | A1* | 5/2012 | Shirai et al. .................. 358/498 |
| 2014/0293374 | A1 | 10/2014 | Nakayama |

FOREIGN PATENT DOCUMENTS

| | | |
|---|---|---|
| JP | 2008-270954 A | 11/2008 |
| JP | 2008-285259 A | 11/2008 |
| JP | 2011-066676 A | 3/2011 |
| JP | 2012-015677 A | 1/2012 |
| JP | 2012-034186 A | 2/2012 |
| JP | 2012-065064 A | 3/2012 |
| JP | 2012-100115 A | 5/2012 |
| JP | 2012-171788 A | 9/2012 |
| JP | 2012-171789 A | 9/2012 |
| JP | 2012-184057 A | 9/2012 |
| JP | 2012-216930 A | 11/2012 |
| JP | 2012-216931 A | 11/2012 |

OTHER PUBLICATIONS

Aug. 29, 2014—(US) Co-pending U.S. Appl. No. 14/472,582.
Sep. 23, 2014—(US) Ex Parte Quayle Office Action—U.S. Appl. No. 14/210,563.

* cited by examiner

IMAGE READING APPARATUS

CROSS REFERENCE TO RELATED APPLICATION

This application claims priority from Japanese Patent Application No. 2012-227354, filed on Oct. 12, 2012, the entire subject matter of which is incorporated herein by reference.

BACKGROUND

1. Technical Field

An aspect of the present disclosure relates to an image reading apparatus and a conveyer device.

2. Related Art

A conventional image reading apparatus is equipped with a chassis. On a rear side of the chassis of the image reading apparatus, an inlet, through which a sheet is introduced, may be formed. An outlet, through which the sheet is ejected, may be formed on a front side of the chassis. Inside the chassis, a conveyer path ranging from the inlet to the outlet may be formed. An image reading unit may be disposed along the conveyer path. In positions adjacent to the image reading unit, on each side closer to the inlet and to the outlet, a pair of conveyer rollers may be disposed.

The sheet introduced into the chassis through the inlet may be conveyed in a sheet-conveying direction along the conveyer path by the conveyer rollers, and in midst of the conveyer path, an image on the sheet may be read by the image reading unit.

The conventional image reading apparatus may be configured to read an image appearing on a smaller-sized card, of which width and length are smaller than those of the sheet. In this regard, a part of the outlet formed on the front side may be configured to serve both as a card inlet, through which the card can be inserted, and as a card outlet, through which the card can be ejected. The image reading apparatus may include a system to rotate the pairs of conveyer rollers bi-directionally, i.e., in normal and reverse directions, which are opposite from each other. The conventional image reading apparatus may include a sensor for detecting the card reaching and passing by the image reading unit in a position between the image reading unit and one of the pairs of conveyer rollers closer to the inlet.

When the card is inserted through the card inlet being a part of the sheet outlet, the pairs of conveyer rollers may be rotated in the reverse direction opposite from a direction for the sheet to be conveyed in the sheet-conveying direction, so that the card is drawn inside through the card inlet by the pair of conveyer rollers rotating in the reverse direction and conveyed toward the inlet.

When the card conveyed toward the inlet passes by the sensor, the rotating direction of the pairs of conveyer rollers is switched to the normal direction to convey the card in the same direction as the sheet-conveying direction. Thus, the card is conveyed toward the card outlet. While the card is conveyed in the sheet-conveying direction toward the outlet, an image appearing on the card is read by the image reading unit.

SUMMARY

In the conventional image reading apparatus, however, the pair of conveyer rollers on the side of the image reading unit closer to the sheet inlet are disposed along a part of the conveyer path, which is used commonly for conveying the sheet and the card. In this regard, after a tail end of the card closer to the outlet passes by the sensor and before the rotating direction of the conveyer rollers is switched to the normal direction, the card may fall out of the nip of the pair of conveyer rollers.

Unlike the conventional image reader apparatus, an image reading apparatus having a card inlet on a rear side of a chassis may be suggested. In this image reading apparatus, a card inserted through the card inlet may be conveyed toward a card outlet being a part of a sheet outlet.

In such an image reading apparatus, if the pairs of conveyer rollers are, as they are in the conventional image reading apparatus, disposed on the positions adjacent to the image reading unit on each side closer to the card inlet and to the card outlet, a distance between the card inlet and the position of the pair of conveyer rollers closer to the card inlet may be too long for the smaller-sized card. While conveyance of the card starts at the position of the pair of conveyer rollers closer to the card inlet, if the distance is too long for the card, it may be difficult for the card inserted through the card inlet to reach the pair of conveyer rollers closer to the card inlet.

The present disclosure is advantageous in that an image reading apparatus capable of securely conveying a smaller-sized readable medium, of which width and length are smaller than those of a larger-sized readable medium, is provided.

According to an aspect of the present invention, an image reading apparatus is provided. The image reading apparatus includes a housing including a first housing; a second housing; a first opening located in between the first housing and the second housing and formed to extend longitudinally along a first direction; a second opening formed to communicate with the first opening through a first path, the first path being located in between the first housing and the second housing; a third opening formed in the second housing, a length of the third opening along the first direction being smaller than a length of the first opening along the first direction; a fourth opening formed to communicate with the third opening through a second path, the second path being located inside the second housing, the fourth opening including a part of the second opening; a fifth opening located in a position where a part of the second path located inside the second housing and the first path merge with each other; an image reader disposed in the first path between the second opening and the fifth opening, the image reader extending longitudinally along the first direction; a first roller exposed to a part of the first path ranging between the image reader and the fifth opening; and a second roller exposed to a part of the second path ranging between the third opening and the fifth opening.

BRIEF DESCRIPTION OF THE ACCOMPANYING DRAWINGS

FIG. 1A is a perspective frontward view of an image reading apparatus 1 with a cover 3 being closed, viewed along an upper-left angle, according to an embodiment of the present disclosure. FIG. 1B is a perspective rearward view of the image reading apparatus 1 with the cover 3 being closed, viewed along an upper-right angle, according to the embodiment of the present disclosure.

FIG. 2 is a perspective frontward view of the image reading apparatus 1 with the cover being open, viewed along the upper-left angle, according to the embodiment of the present disclosure.

FIG. 3 is a plane view of the image reading apparatus 1, with the cover 3 being open and an upper housing 14 being in a maintenance position, according to the embodiment of the present disclosure.

Figure 7:
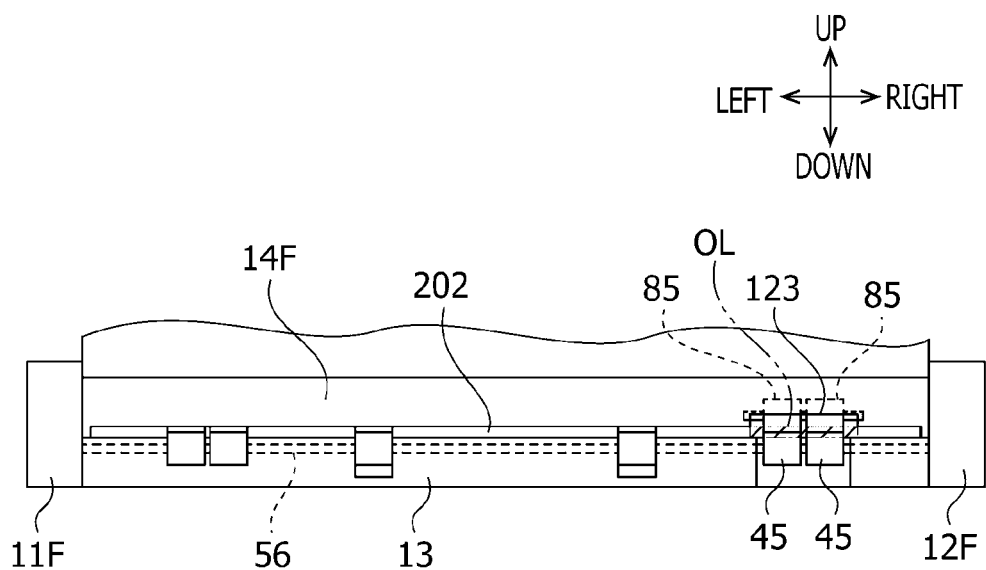

FIG. 7 is an illustrative view of the image reading apparatus 1 according to the embodiment of the present disclosure with a sheet outlet 202 and a card outlet 123 being arranged to partially overlap each other.

DETAILED DESCRIPTION

Hereinafter, embodiments of the present disclosure will be described with reference to the accompanying drawings. It is noted that various connections are set forth between elements in the following description. These connections in general, and unless specified otherwise, may be direct or indirect, and this specification is not intended to be limiting in this respect.

Figure 1A:
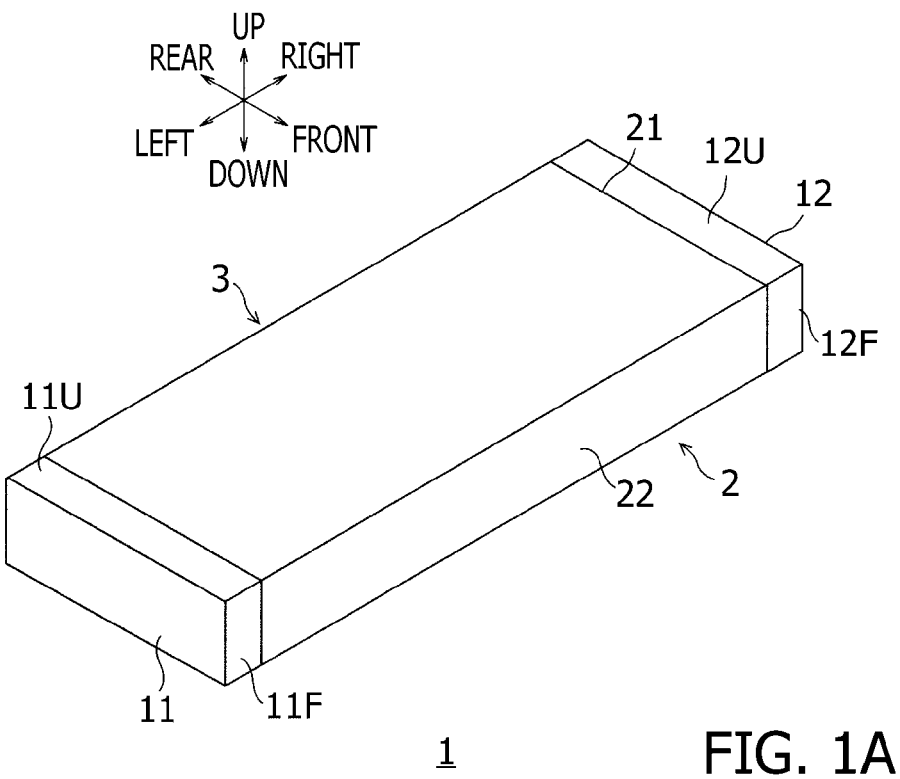

In the embodiments described below, directions concerning the image reading apparatus 1 will be referred to based on orientations indicated by arrows shown in each drawing. For example, in FIG. 1A, a viewer's lower-left side, on which a front cover 22 is disposed, is referred to as a front side of the image reading apparatus 1. A lower-left side in FIG. 1A, which comes on a user's left-hand side with respect to the image reading apparatus 1 when the user faces the front cover 22, is referred to as a left side. A side opposite from the front side, which is on the viewer's upper left side in FIG. 1A, is referred to as a rear side, and a side opposite from the left, which is on the viewer's upper right side, is referred to as a right side. A right-to-left or left-to-right direction of the image reading apparatus 1 may also be referred to as a right-left direction or a widthwise direction. The up-to-down or down-to up direction in FIG. 1A corresponds to a vertical direction of the image reading apparatus 1. The front-to-rear or rear-to-front direction may be referred to as a front-rear direction or a direction of depth. The orientations shown in FIGS. 1B and 2-7 correspond to those indicated by the arrows appearing in FIG. 1A.

<External Configuration>

The image reading apparatus 1 includes a housing 2 and a cover 3.

<Housings>

The housing 2 includes a left-side panel 11, a right-side panel 12, a lower housing 13 and an upper housing 14. The left-side panel 11 and the right-side panel 12 are arranged to be spaced apart from each other along the right-left direction. The lower housing 13 and the upper housing 14 are arranged in positions between the left-side panel 11 and the right-side panel 12. The lower housing 13 is attached to the left-side panel 11 and the right-side panel 12 at widthwise ends thereof.

The upper housing 14 has shafts (not shown) protruding leftward and rightward at a lower-left end and a lower-right end thereof respectively. The shafts are rotatably supported by the left-side panel 11 and the right-side panel 12 respectively. Thus, the upper housing 14 is rotatable about the shafts between a regular position (see FIG. 2) and a maintenance position (see FIG. 3).

Figure 2:
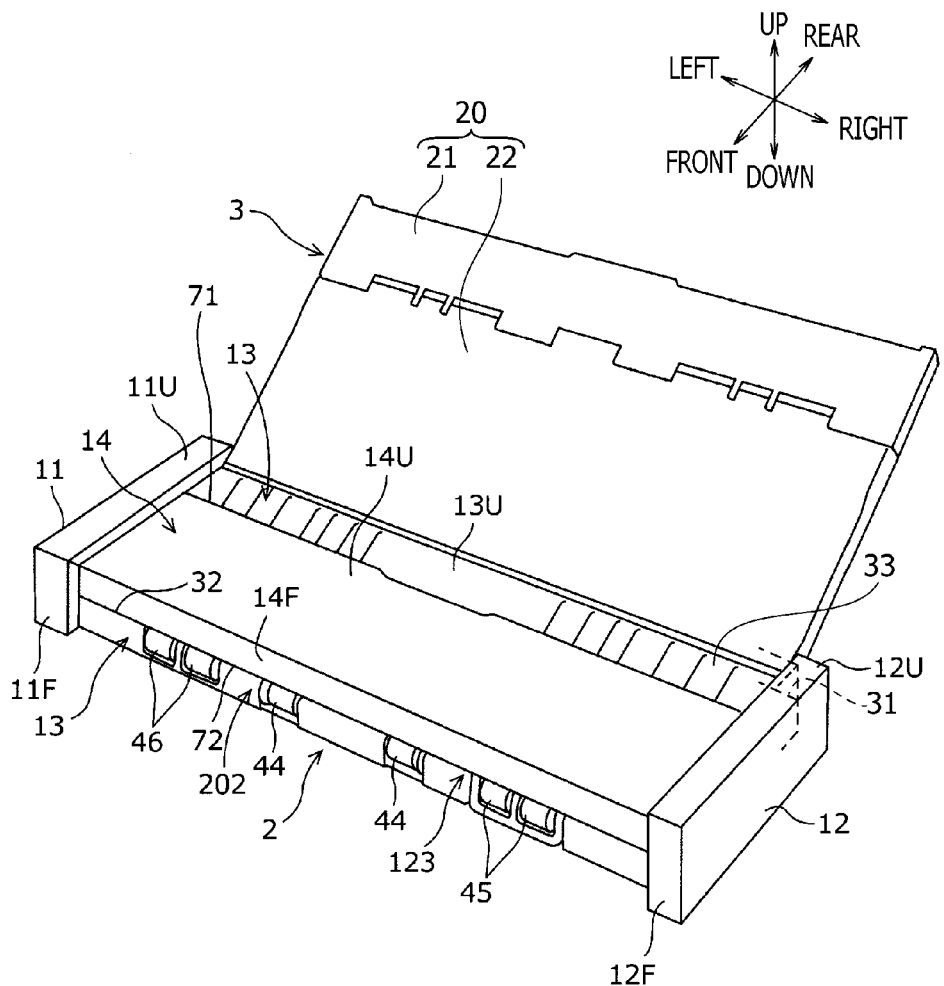

As shown in FIG. 2, when in the regular position, the upper housing 14 vertically overlaps the lower housing 13 from above. An upper face 14U of the upper housing 14 is in a lower position with respect to an upper face 11U of the left-side panel 11 and an upper face 12U of the right-side panel 11. When the upper housing 14 is in the regular position, a front face 14F of the upper housing 14 is in a rearward position with respect to a front face 11F of the left-side panel 11 and a front face 11F of the right-side panel 12.

The upper housing 14 is movable from the regular position to the maintenance position by being pivoted frontward with respect to the lower housing 13. In the maintenance position, the upper housing 14 extends upper-frontward from an upper-front edge of the lower housing 13.

<Cover>

The cover 3 includes an upper cover 21 and a front cover 22, which serve as a tray 20. The upper cover 21 is movable between a closed position (see FIG. 1B) and an open position (see FIG. 2). The front cover 22 is pivotable with respect to the upper cover 21 to move between a bended position (see FIG. 1A) and an extended position (see FIG. 2). When in the extended position, the front cover 22 extends along a same plane as the upper cover 21.

When the upper cover 21 is in the open position with the front cover 22 being in the extended position, as shown in FIG. 2, the upper cover 21 and the front cover 22 extend upper-rearward from an upper-rear edge of the housing 2. The upper cover 21 and the front cover 22 extending upper-rearward integrally form the tray 20 being in an open position. On the tray 20 in the open position, sheets SH to be fed inside the housing 2 may be placed. When the upper cover 21 is in the closed position with the front cover 22 being in the bended position, the upper cover 21 and the front cover 22 integrally form the tray 20 being in a closed position.

Figure 4:
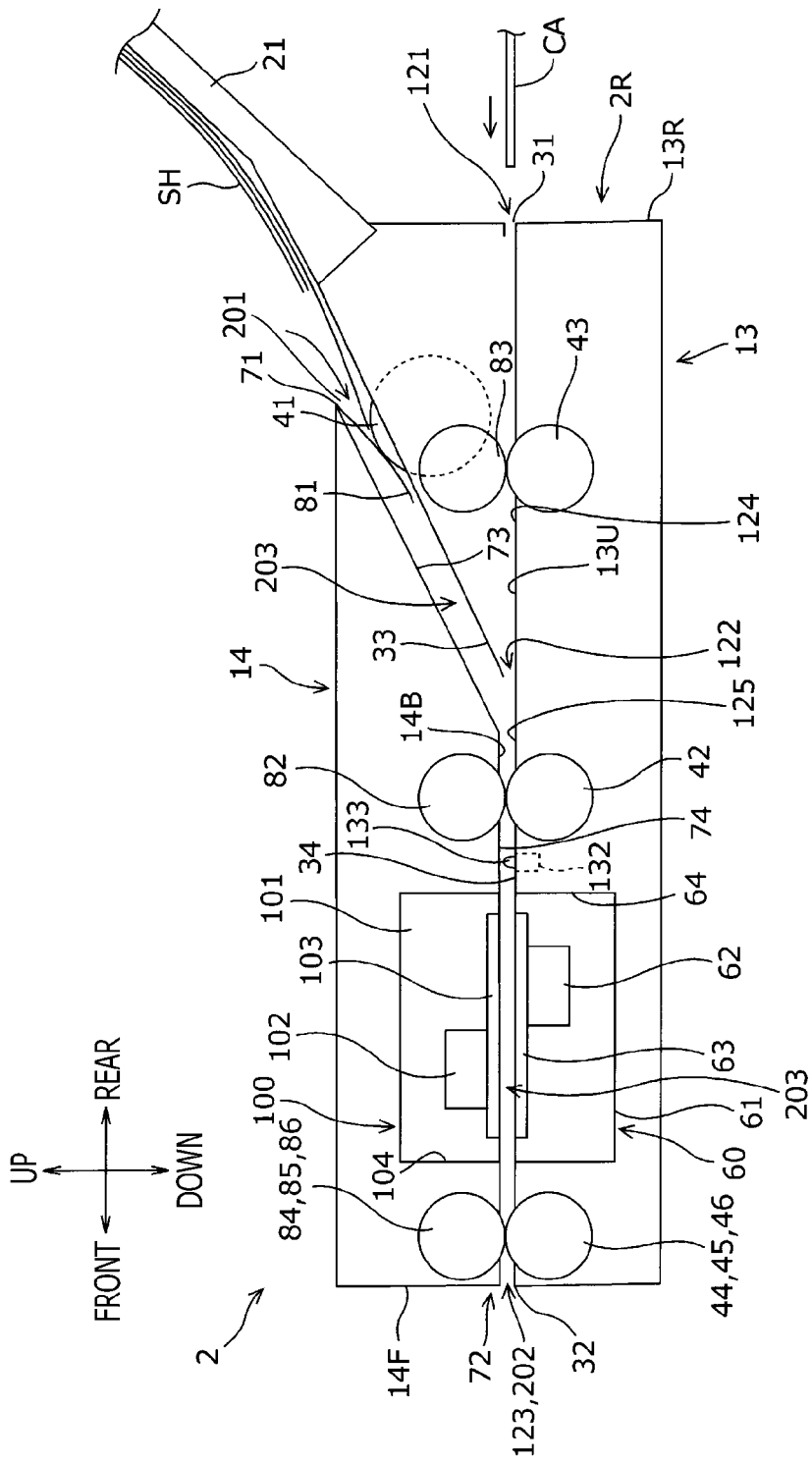
FIG. 4 is a cross-sectional side view of the image reading apparatus 1 according to the embodiment of the present disclosure.

A vertical position of a rear edge 31 of the lower housing 13 is substantially the same as a vertical position of a front edge 32 of the lower housing 13. The lower housing 13 includes, as shown in FIG. 4, an inclined section 33 and a flat section 34. The inclined section 33 extends lower-frontward from an upper position with respect to the rear edge 31 to the same vertical level as the front edge 32. The flat section 34 extends from a front end (unsigned) of the inclined section 33 to the front edge 32 substantially at the same height as the front edge 32.

As shown in FIG. 4, the upper housing 14 includes a rear edge 71, which is arranged in an upper position with respect to the inclined section 33 of the lower housing 13 to be spaced apart from the inclined section 33 (see also FIG. 2). A front edge 72 of a lower plane 14B of the upper housing 13 is placed in an upper position with respect to the front edge 32 of an upper plane 13U (see FIG. 4) of the lower housing 13 to be spaced apart from the upper plane 13U.

Figure 3:
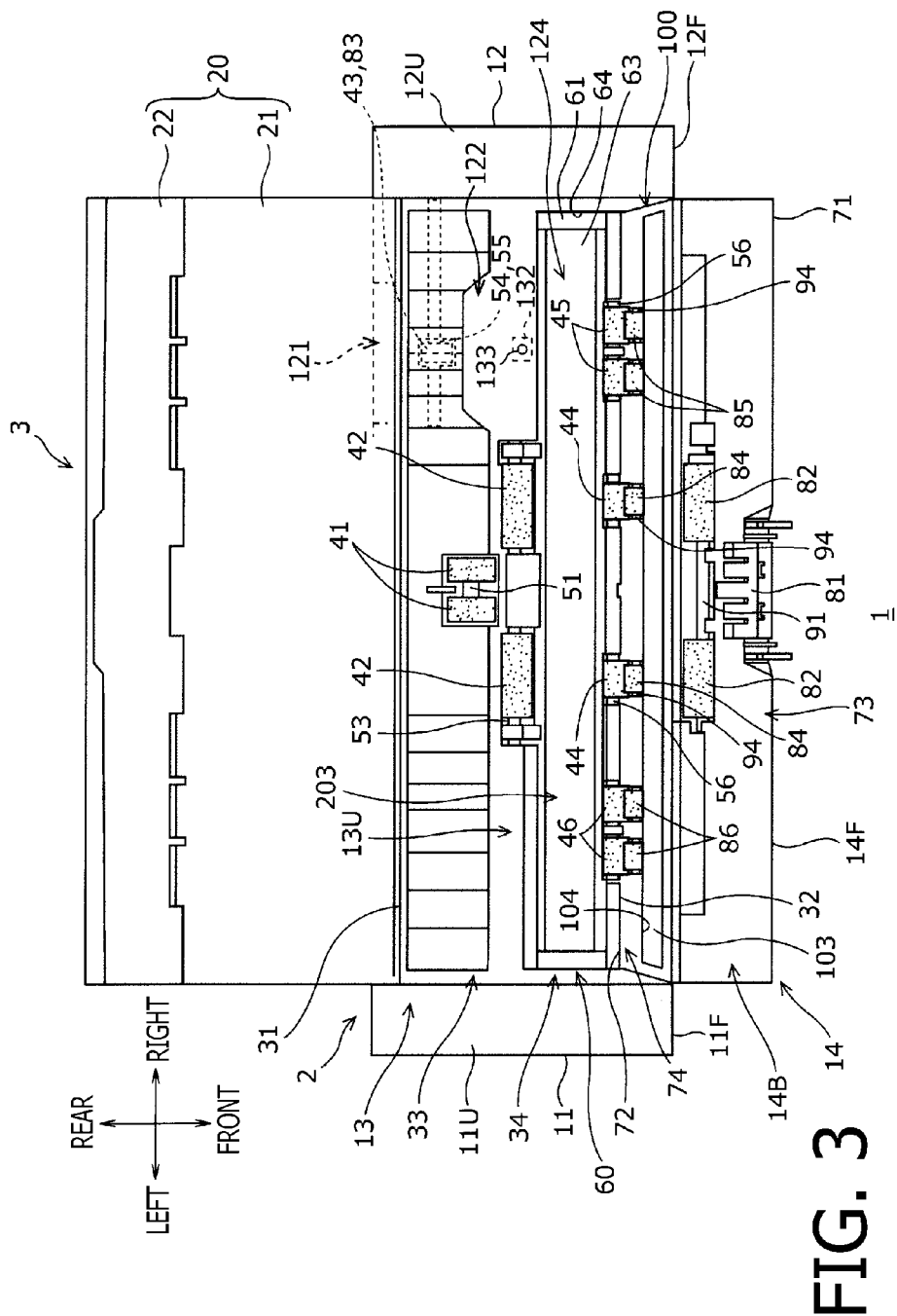

The upper housing 14 includes, as shown in FIGS. 3 and 4, an inclined section 73 and a flat section 74.

The inclined section 73 extends lower-frontward in parallel with the inclined section 33 of the lower housing 13 from the rear edge 71 to the same vertical level as the front edge 72. The flat section 74 extends from a front end (unsigned) of the inclined section 73 to the front edge 72 substantially at the same height as the front edge 72 in parallel with the flat section 34 of the lower housing 13.

As shown in FIG. 4, a sheet inlet 201, a sheet outlet 202, and a sheet-conveyer path 203 ranging between the sheet inlet 201 and the sheet outlet 202 are formed in between the upper housing 14 and the lower housing 13. The sheet inlet 201 is formed to open upper-rearward in a position between the rear edge 71 of the upper housing 14 and the inclined section 33 of the lower housing 13 and extends longitudinally along the widthwise direction. The sheet outlet 202 is formed to open frontward in a position between the front edge 72 of the upper housing 14 and the front edge 32 of the lower housing 13 and extends longitudinally along the widthwise direction. A width of the sheet inlet 201 and a width of the sheet outlet 202 are substantially the same and are substantially larger than a width of the sheet SH to be fed in the housing 2. The sheet-conveyer path 203 connects the sheet inlet 201 and the sheet outlet 202 to communicate with each other. The sheet-conveyer path 203 includes a space formed in between the inclined section 73 of the upper housing 14 and a space formed in between the flat section 74 of the upper housing 14 and the flat section 34 of the lower housing 13. The sheet SH fed through the sheet inlet 201 is conveyed in the sheet-conveyer path 203 formed in the housing 2. Hereinafter, some of components included in the image reading apparatus 1 will be described according to an order of arrangement along a flow of the sheet SH being conveyed in the sheet-conveyer path 203.

The image reading apparatus 1 includes a feed roller 41, a separator piece 81, an LF (linefeed) roller 42, an LF pinch roller 82, a card LF roller 43, a card LF pinch roller 83, a first reading unit 100, a second reading unit 60, a first roller 44, a first pinch roller 84, a card ejection roller 45, a card ejection pinch roller 85, a second roller 46, and a second pinch roller 86.

The feed roller 41 includes, as shown in FIG. 3, two rollers. The two rollers in the feed roller 41 are attached to a rotation shaft 51. The feed roller 41 is arranged in a central area along the widthwise direction in the inclined section 33. The rotation shaft 51 extends along the widthwise direction inside the lower housing 13 and is rotatably supported by the lower housing 13.

The separator piece 81 is made of, for example, rubber. As shown in FIG. 4, the separator piece 81 is attached to the upper housing 14 at a base end thereof. The separator piece 81 is placed to be resiliently in contact with peripheries of the feed roller 41. The separator piece 81 and the feed roller 41 separate one of the plurality of sheets SH from the other sheets SH. The separated sheet SH is conveyed frontward. In the present embodiment, the front side and the rear side of the image reading apparatus 1 along the sheet-conveyer path 203 correspond to a downstream side and an upstream side of the sheet-conveying direction respectively.

The LF roller 42 and the LF pinch roller 82 are arranged on a downstream side along the sheet-conveying direction with respect to the feed roller 41 and the separator piece 81. As shown in FIG. 3, the LF roller 42 includes two rollers. The two rollers in the LF roller 42 are attached to a rotation shaft 53. The LF pinch roller 82 includes two pinch rollers. The two rollers in the LF pinch roller 82 are attached to a rotation shaft 91. Peripheries of the LF pinch roller 82 contact peripheries of the LF roller 42 from above. When the LF roller 42 rotates, the LF pinch roller 82 is rotated in accordance with the rotation of the LF roller 42.

The card LF roller 43 is arranged on a right-hand side along the widthwise direction and on the rear side along the front-rear direction in the lower housing 13 in a lower position with respect to the inclined section 33. A diameter of the card LF roller 43 is equal to a diameter of the LF roller 42. The card LF roller 43 is, as shown in FIG. 3, attached to a rotation shaft 54. The card LF pinch roller 83 is arranged in a rearward position with respect to the LF pinch roller 82. The card LF pinch roller 83 is attached to a rotation shaft 55. As shown in FIG. 4, peripheries of the card LF pinch roller 83 contact peripheries of the card LF roller 43 from above. When the card LF roller 43 rotates, the card LF pinch roller 83 is rotated in accordance with the rotation of the card LF roller 43.

As shown in FIG. 4, the image reading apparatus includes the first reading unit 100 and the second reading unit 60, which are arranged in the sheet-conveyer path 203 between the sheet outlet 202 and the card pass-through opening 122, on a downstream side along the sheet-conveying direction with respect to the LF roller 42 and the LF pinch roller 82. The first reading unit 100 includes, for example, a CIS (contact image sensor) holder 101, a CIS unit 102, and a reading window 103. The second reading unit 60 includes a CIS holder 61, a CIS unit 62, and a reading window 63.

The CIS unit 62 is accommodated in the CIS holder 61. Inside the CIS holder 61, for example, an LED (laser emitting diode), a lens, and an image sensor are stored. The CIS unit 62 is arranged to longitudinally extend along the widthwise direction. The CIS unit 102 is accommodated in the CIS holder 101. The CIS unit 102 includes, for example, an LED, a lens, and an image sensor. The CIS unit 102 is arranged to longitudinally extend along the widthwise direction.

The reading window 63 is a piece of transparent colorless glass. The reading window 63 is held by the CIS holder 61. The reading window 63 seals an upper side of the CIS holder 61. The reading window 103 is a piece of transparent colorless glass. The reading window 103 is held by the CIS holder 101. The reading window 103 seals a lower side of the CIS holder 101.

The CIS holder 61 holding the CIS unit 62 and the reading window 63 is fitted in an opening 64, which is formed in the flat section 34 of the lower housing 13. The CIS holder 101 holding the CIS unit 102 and the reading window 103 is fitted in an opening 104, which is formed in the flat section 74 of the upper housing 14.

The LF roller 42 and the LF pinch roller 82 convey the sheet SH. An image on an upper surface of the sheet SH being conveyed is read by the first reading unit 100. An image on a lower surface of the sheet SH being conveyed is read by the second reading unit 60.

The first roller 44 and the first pinch roller 84 are arranged on a downstream side along the sheet-conveying direction with respect to the CIS unit 102 and the CIS unit 62. The first roller 44 includes, as shown in FIG. 3, two rollers. The two rollers in the first roller 44 are attached to a rotation shaft 56. The first pinch roller 84 includes two pinch rollers. The two pinch rollers in the first pinch roller 84 are attached to a rotation shaft 94. As shown in FIG. 4, peripheries of the first pinch roller 84 contact peripheries of the first roller 44 from above. When the first roller 44 rotates, the first pinch roller 84 is rotated in accordance with the rotation of the first roller 44.

The card ejection roller 45 and the card ejection pinch roller 85 are arranged on a downstream side along the sheet-conveying direction with respect to the CIS unit 102 and the CIS unit 62. A diameter of the card ejection roller 45 is equal to the diameter of the LF roller 42 and the card LF roller 43. The card ejection roller 45 includes, as shown in FIG. 3, two rollers. The two rollers in the card ejection roller 45 are attached to the rotation shaft 56. The card ejection pinch roller 85 includes two pinch rollers. The two pinch rollers in the card ejection pinch roller 85 are attached to the rotation shaft 94. As shown in FIG. 4, peripheries of the card ejection pinch roller 85 contact peripheries of the card ejection roller 45 from above. When the card ejection roller 45 rotates, the card ejection pinch roller 85 is rotated in accordance with the rotation of the card ejection roller 45.

The second roller 46 and the second pinch roller 86 are arranged on a downstream side along the sheet-conveying direction with respect to the CIS unit 102 and the CIS unit 62. The second roller 46 is, as shown in FIG. 3, arranged in a symmetrical position with respect to the card ejection roller 45 about the first roller 44 along the widthwise direction. The second roller 46 includes two rollers. The two rollers in the second roller 46 are attached to the rotation shaft 56. The second pinch roller 86 is arranged in a symmetrical position with respect to the card ejection pinch roller 85 about the first pinch roller 84 along the widthwise direction. The second pinch roller 86 includes two pinch rollers. The two pinch rollers in the second pinch roller 86 are attached to the rotation shaft 94. As shown in FIG. 4, peripheries of the second pinch roller 86 contact peripheries of the second roller 46 from above. When the second roller 46 rotates, the second pinch roller 86 is rotated in accordance with the rotation of the second roller 46.

A distance between the rotation shaft 54, to which the card LF roller 43 is attached, and the rotation shaft 56, to which the card ejection roller 45 is attached, is smaller than a length of a longer side of a card CA (see FIG. 4), e.g., 85.60 mm. Therefore, the card CA can contact both the card LF roller 43 and the card ejection roller 45 simultaneously and can be steadily conveyed in the sheet-conveyer path 203.

In the image reading apparatus 1, an image on the card CA, which has a smaller width than the width of the sheet SH, can be read.

Figure 1B:
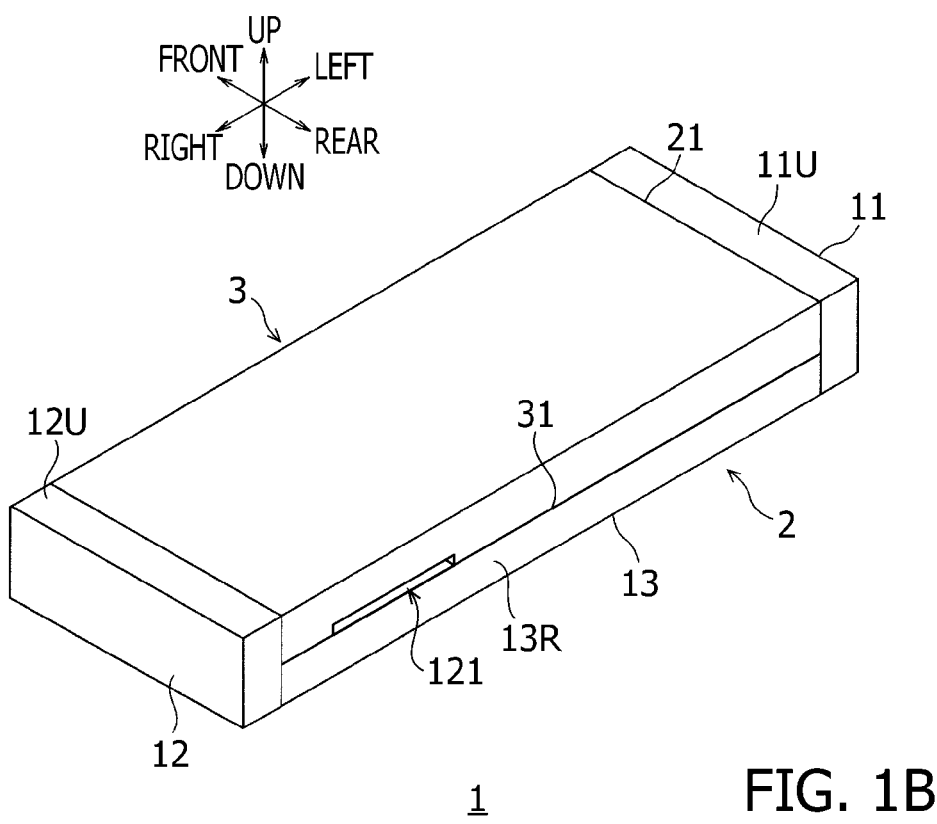

In order for the image on the card CA to be read, as shown in FIG. 1B, a card inlet 121 is formed in the lower housing 13. The card inlet 121 is formed on a right-hand side along the widthwise direction and on a rear side 13R of the housing 13 in a position to align with the card LF roller 43 and the card LF pinch roller 83 along the front-rear direction. The card inlet 121 is formed to have a narrow rectangular shape longitudinally extending along the widthwise direction. A width of the card inlet 121 along the widthwise direction is larger than a dimension of a smaller side of International Standard card size ID-1 (i.e., 53.98 mm), which is standardized by International Organization for Standardization (ISO) and International Electrotechnical Commission (IEC), and smaller than a dimension of a longer side of the card size (i.e., 85.60 mm). While the width of the card CA is smaller than the width of the sheet SH, the width of the card inlet 121 along the widthwise direction is smaller than the width of the sheet inlet 201. A left-side end of the card inlet 121 along the widthwise direction is in a rightward position with respect to the LF roller 42. In other words, the LF roller 42 is disposed in a leftward position, closer to the left-hand side of the lower housing 13, along the widthwise direction with respect to the card inlet 121.

As shown in FIG. 4, a card-conveyer path 124 is formed in between the upper plane 13U of the flat section 34 of the lower housing 13 and the lower plane 14B of the flat section 74 of the upper housing 14 and in the lower position with respect to the inclined section 33 of the upper housing 13. The card-conveyer path 124 includes a space underneath the inclined section 33 in the lower housing 13. The card-conveyer path 124 includes a common conveyer path 125, and the common conveyer path 125 is included in a part of the sheet conveyer path 203. That is, the common conveyer path 125 is a path which is common to the sheet-conveyer path 203 and the card-conveyer path 124. The common conveyer path 125 is an area coincident with a right-side part of the sheet-conveyer path 203. The common conveyer path 125 includes a space between the upper plane 13U of the flat section 34 of the lower housing 13 and the lower plane 14B of the flat section 74 of the upper housing 14.

As mentioned above, the rear edge 31 of the lower housing 13 is at the substantially same height as the front edge 32 of the lower housing 13. The card-conveyer path 124 extends from the rear edge 31 to the front edge 32 along the front-rear direction. Therefore, a card-conveying direction for the card CA extends, when the image reading apparatus 1 is placed on a flat horizontal plane, substantially horizontally along the front-rear direction.

As shown in FIGS. 3 and 4, a card pass-through opening 122 is formed at a lower front end of the inclined section 33 of the lower housing 13. In other words, the card pass-through opening 122 is formed in a frontward position with respect to the card inlet 121 in the inclined section 33. The card pass-through opening 122 is formed in a position, at which the sheet-conveyer path 203 merges with the card-conveyer path 124. Thus, the card pass-through opening 122 is formed in a position between the lower-front end of the inclined section 33 and the flat section 34 in the lower housing 13. The card pass-through opening 122 connects the area between the flat section 34 and the flat section 74 with the area underneath the inclined section 33. Thus, the card CA can be conveyed from the area underneath the inclined section 33 to the area between the flat section 34 and the flat section 74.

Within the portion between the card inlet 121 and the card pass-through opening 122, the card-conveyer path 124 is formed within the lower housing 13, and within the portion between the card pass-through opening 122 and a card outlet 123, the card-conveyer path 124 is formed between the upper housing 14 and the lower housing 13. Thus, the card-conveyer path 124 is formed in between the card inlet 121 and the card outlet 123. However, the card-conveyer path 124 may not necessarily be formed in the above arrangement but may be arranged within the upper housing 13 or solely in between the upper housing 14 and the lower housing 13 as long as the card-conveyer path 124 is formed inside the housing 2.

As shown in FIG. 7, the card outlet 123 is formed within the sheet outlet 202, at a vertical level and at a widthwise position aligned with the card ejection roller 45 and the card ejection pinch roller 85, and is formed in a frontward position with respect to the card ejection roller 45 and the card ejection pinch roller 85.

As shown in FIG. 4, the card outlet 123 is formed to open frontward in a position between the front edge 72 of the upper housing 14 and the front edge 32 of the lower housing 13. As shown in FIG. 7, a lower part of the card outlet 123 overlaps with a right-side part of the sheet outlet 202 at an overlapping area OL along the front-rear direction. Therefore, the sheet SH and the card CA pass through the overlapping area OL when being ejected.

<Reading an Image on the Sheet>

When the image on the sheet SH is to be read by the image reading apparatus 1, as shown in FIGS. 2 and 4, the upper cover 21 is set in the open position, and the front cover 22 is set in the extended position. The sheets SH are placed on the tray 20 in the open position, which is formed by the upper cover 21 and the front cover 22.

The sheets SH placed on the tray 20 are inserted in the sheet inlet 201 and moved inward until front ends of the sheets SH reach the feed roller 41 and the separator piece 81. The feed roller 41 is disposed to be partially exposed to the sheet-conveying path 203 to contact the separator piece 81. When the sheets SH reach the feed roller 41 and the separator piece 81, the feed roller 41 is rotated in a counterclockwise direction from a view point on the right-hand side (see FIG. 4). By the rotation of the feed roller 41, conveying force is applied from the peripheries of the feed roller 41 to a lower surface of a lowermost one of the sheets SH, and the sheets SH are conveyed toward the LF rollers 42, 82. When the front end of the lowermost sheet SH is nipped by the feed roller 41 and the separator piece 81, the lowermost sheet SH is separated from the other sheets SH, so that the lowermost sheet SH alone passes through an intermediate position between the feed roller 41 and the separator piece 81.

The LF roller 42 is rotated in the counterclockwise direction from the view point on the right-hand side. The LF roller 42 is disposed to be partially exposed to a part of the sheet-conveying path 203 ranging between the CIS units 62, 102 and the card pass-through opening 122 to contact the LF pinch roller 82. The LF pinch roller 82 rotates in a clockwise direction from the view point on the right-hand side. When the front end of the sheet SH passing through the intermediate position between the feed roller 41 and the separator piece 81 reaches the LF roller 42, conveying force is applied to the sheet SH by the LF roller 42.

The sheet SH passing through an intermediate position between the LF roller 42 and the LF pinch roller 82 passes over the reading window 63 and below the reading window 103. In this regard, light is emitted from the LEDs in the CIS units 62, 102 toward the lower and upper surfaces of the sheet SH through the reading windows 63, 103 respectively. The light reflected on the lower and upper surfaces of the sheet SH is received by the image sensors in the CIS units 62, 102 respectively, and thereby the images on the lower and upper surfaces of the sheet SH are read.

The first roller 44, the second roller 46, and the card ejection roller 45 are rotated in the counterclockwise direction from the view point on the right-hand side. The first pinch roller 84, the second pinch roller 86, and the card ejection pinch roller 85 are rotated in the clockwise direction from the view point on the right-hand side. When the front end of the sheet SH passed by the reading windows 63, 103 reaches the first roller 44, the second roller 46, and the card ejection roller 45, conveying force is applied to the sheet SH by the first roller 44, the second roller 46, and the card ejection roller 45 respectively.

The sheet SH passed through the intermediate position between the first roller 44 and the first pinch roller 84 and the intermediate position between the card ejection roller 45 and the card ejection pinch roller 85 is conveyed to pass through the sheet ejection 202 and ejected outside the housing 2.

<Reading an Image on the Card>

When the image on the card CA is to be read by the image reading apparatus 1, the card CA is inserted through the card inlet 121 with the shorter side thereof oriented frontward. The front end of the card CA being inserted reaches an intermediate position between the card LF roller 43 and the LF pinch roller 83. The card CA inserted through the card inlet 121 is conveyed in the card-conveyer path 124 and the common conveyer path 125 in the following manner.

The card LF roller 43 is rotated in the counterclockwise direction from the view point on the right-hand side. The card LF roller 43 is disposed to be partially exposed to a part of the card-conveying path 124 ranging between the card inlet 121 and the card pass-through opening 122 to contact the card LF pinch roller 83. The card LF pinch roller 83 is rotated in the clockwise direction from the view point on the right-hand side along with the rotation of the card LF roller 43. When the front end of the card CA inserted inside the card inlet 121 reaches the peripheries of the card LF roller 43 and the card LF pinch roller 83, conveying force is applied to the card CA by the card LF roller 43.

Thereafter, the card CA passes through the card pass-through opening 122 and an intermediate position between the first reading unit 100 and the second reading unit 60. In this regard, light is emitted from the LEDs in the CIS units 62, 102 toward lower and upper surfaces of the card CA through the reading windows 63, 103 respectively. The light reflected on the lower and upper surfaces of the card CA is received by the image sensors in the CIS units 62, 102 respectively, and thereby the images appearing on the lower and upper surfaces of the card CA are read.

The card ejection roller 45 is rotated in the counterclockwise direction from the view point on the right-hand side. The card ejection roller 45 is disposed to be partially exposed to the right-side part of the sheet-conveying path 203 ranging between the sheet outlet 202 and the CIS units 62, 102, which coincides with the common conveyer path 125, to contact the card ejection pinch roller 85. Meanwhile, the card ejection pinch roller 85 is rotated in the clockwise direction from the view point on the right-hand side in accordance with the rotation of the card ejection roller 45. When the front end of the card CA passed through the intermediate position between the first reading unit 100 and the second reading unit 60 reaches the peripheries of the card ejection roller 45, conveying force is applied to the card CA by the card ejection roller 45. Thus, the card CA passes through the card outlet 123 and is ejected outside the housing 2.

<Driving Force Transmission Mechanism>

Figure 5:
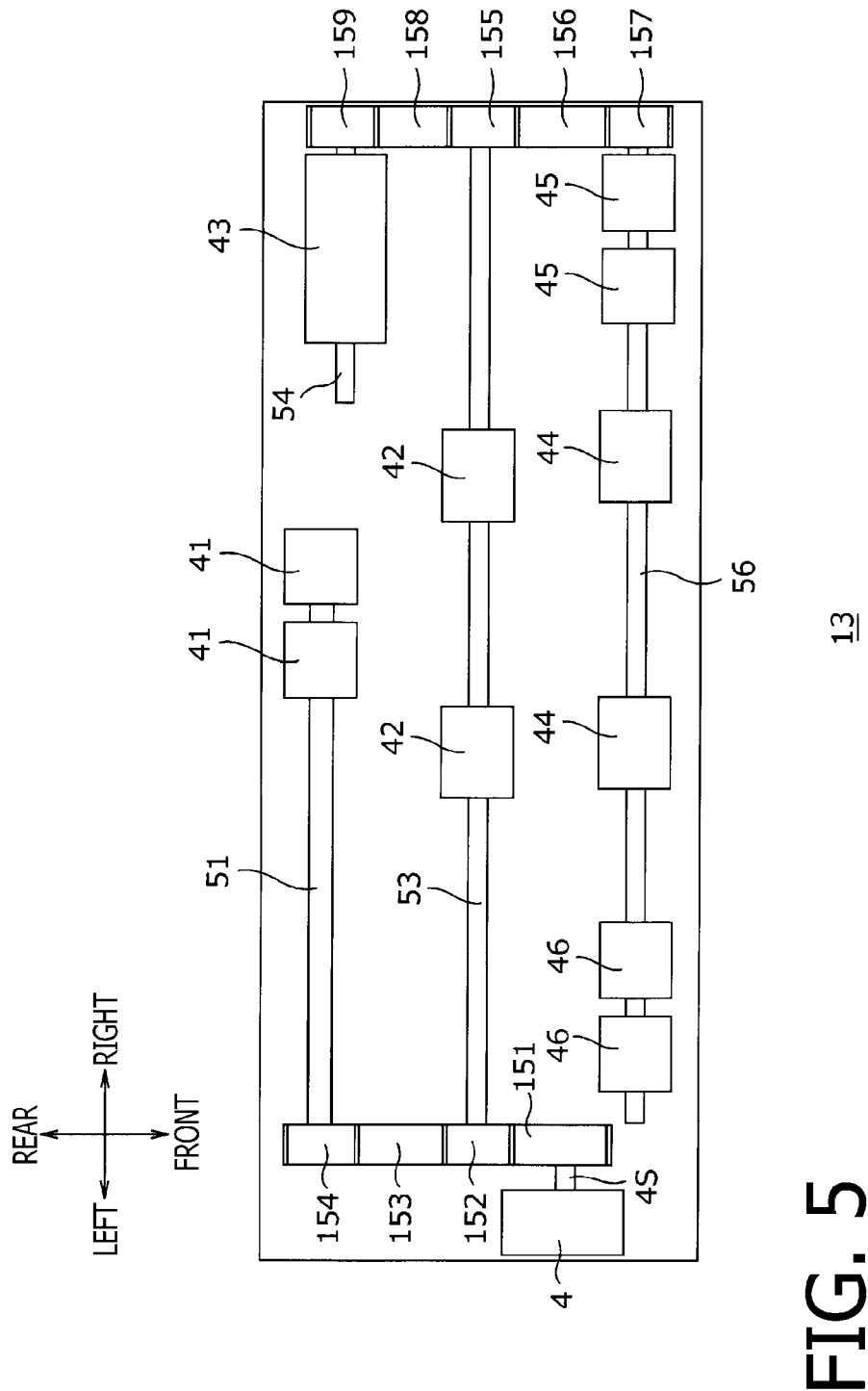
FIG. 5 is a plane view of a driving force transmission mechanism in the image reading apparatus 1 according to the embodiment of the present disclosure.

As shown in FIG. 5, the image reading apparatus 1 includes a motor 4. The motor 4 is arranged on a left-hand side in the housing 2.

The image reading apparatus 1 includes a motor gear 151, a first LF roller gear 152, a first transmission gear 153, a feed roller gear 154, a second LF roller gear 155, a second transmission gear 156, an ejection gear 157, a third transmission gear 158, and a card LF roller gear 159.

The first LF roller gear 152, the second LF roller gear 155, the ejection gear 157, and the card LF roller gear 159 are formed to have gear teeth on circumference thereof respectively, and quantities of the teeth formed in the first LF roller gear 152, the second LF roller gear 155, the ejection gear 157, and the card LF roller gear 159 are equal to one another.

The motor gear 151 is attached to a motor shaft 4S of the motor 4. The motor 4 is arranged to have the motor shaft 4S to extend rightward.

The first LF roller gear 152 is attached to a left-side end of the rotation shaft 53 and is arranged in a rearward position with respect to the motor gear 151. The gear teeth of the first LF roller gear 152 are meshed with the gear teeth formed on the circumference of the motor gear 151.

The first transmission gear 153 is arranged on a opposite side from the motor gear 151 with respect to the first LF roller gear 152, i.e., in a rearward position with respect to the first LF roller gear 152. A rotation axis of the first transmission gear 153 extends along the widthwise direction. The gear teeth formed on the circumference of the first transmission gear 153 are meshed with the gear teeth of the first LF roller gear 152.

The feed roller gear 154 is attached to a left-side end of the rotation shaft 51 and is arranged in an opposite position from the first LF roller gear 152 with respect to the first transmission gear 153, i.e., in a rearward position with respect to the first transmission gear 153. The gear teeth formed on the circumference of the feed roller gear 154 are meshed with the gear teeth of the first transmission gear 153.

The second LF roller gear 155 is attached to a right-side end of the rotation shaft 53 and is arranged on a right-hand side in the housing 2.

The second transmission gear 156 is arranged in a frontward position with respect to the second LF roller gear 155. A rotation axis of the second transmission gear 156 extends along the widthwise direction. The gear teeth formed on the circumference of the second transmission gear 156 are meshed with the gear teeth of the second LF roller gear 155.

The ejection gear 157 is attached to a right-side end of the rotation shaft 56 and is arranged in an opposite position from the second LF roller gear 155 with respect to the second transmission gear 156, i.e., in a frontward position with respect to the second transmission gear 156. The gear teeth formed on the circumference of the ejection gear 157 are meshed with the gear teeth of the second transmission gear 156.

The third transmission gear 158 is arranged in an opposite position from the second transmission gear 156 with respect to the second LF roller gear 155, i.e., in a rearward position with respect to the second transmission gear 156. A rotation axis of the third transmission gear 158 extends along the widthwise direction. The gear teeth formed on the circumference of the third transmission gear 158 are meshed with the gear teeth of the second LF roller gear 155.

The card LF roller gear 159 is attached to a right-side end of the rotation shaft 54 and is arranged in an opposite position from the second LF roller gear 155 with respect to the third transmission gear 158, i.e., in a rearward position with respect to the third transmission gear 158. The gear teeth formed on the circumference of the card LF roller gear 159 are meshed with the gear teeth of the third transmission gear 158. In the following description of behaviors of the gears, rotating directions of the gears are based on a view point on the right-hand side of the image reading apparatus 1.

When the sheet SH or the card CA is conveyed, the motor 4 is activated, and the motor shaft 4S is rotated in the clockwise direction. The rotation of the motor shaft 4S is transmitted to the first LF roller gear 152 via the motor gear 151. Thereby, the first LF roller gear 152, the rotation shaft 53, the LF roller 42, and the second LF roller gear 155 are rotated in the counterclockwise direction.

The rotation of the first LF roller gear 152 is transmitted to the first transmission gear 153, and the first transmission gear 153 rotates in the clockwise direction. The rotation of the first transmission gear 153 is transmitted to the feed roller gear 154. Thereby, the feed roller gear 154, the rotation shaft 51, and the feed roller 41 are rotated in the counterclockwise direction.

Meanwhile, the rotation of the second LF roller gear 155 is transmitted to the second transmission gear 156 and the third transmission gear 158. The second transmission gear 156 rotates in the clockwise direction, and the rotation of the second transmission gear 156 is transmitted to the ejection gear 157. Thereby, the ejection gear 157, the rotation shaft 56, the first ejection roller 44, the card ejection roller 45, and the second ejection roller 46 are rotated in the counterclockwise direction.

With the rotation transmitted to the third transmission gear 158, the third transmission gear 158 rotates in the clockwise direction, and the rotation of the third transmission gear 158 is transmitted to the card LF roller gear 159. Thereby, the card LF roller gear 159, the rotation shaft 54, and the card LF roller 43 are rotated in the counterclockwise direction.

Thus, the image reading apparatus 1 has the feed roller 41, which is arranged along the sheet-conveyer path 203 and conveys the sheet SH by the driving force transmitted from the motor 4. The driving force from the motor 4 is transmitted to the rotation shaft 54 via the rotation shaft 53 and to the rotation shaft 51 of the feed roller 41. The motor 4 and the gear 154 of the feed roller 41 are arranged on the leftward position with respect to the feed roller 41 along the widthwise direction, while the first LF roller gear 152, the second LF roller gear 155, the card LF roller gear 159, and the ejection gear 157 are arranged on the rightward position with respect to the feed roller 41 along the widthwise direction.

<Entry Sensor>

The image reading apparatus 1 includes, as shown in FIG. 4, an entry sensor 132. The entry sensor 132 includes, for example, a microswitch. The entry sensor 132 is arranged on the lower housing 13 in a position between the card LF roller 43 and the second reading unit 60. A movable piece 133 of the entry sensor 132 protrudes upward from the upper plane 13U of the lower housing 13 into the card-conveyer path 124.

When the card CA is conveyed in the card-conveyer path 124 and the front end of the card CA contacts the movable piece 133, the movable piece 133 is moved by the front end of the card CA from a regular position, and a level of signals output from the entry sensor 132 changes. The signals are input in a controller, which is not shown. Thus, based on the level of signals output from the entry sensor 132, the controller can detect the card CA entering the position of the entry sensor 132. When entry of the card CA is detected, based on the timing of the detection, the CIS units 62, 102 start reading the images appearing on the card CA.

Thus, the image reading apparatus 1 is equipped with the entry sensor 132, which is arranged in a position between the card LF roller 43 and the second reading unit 60 along the direction of depth and capable of detecting the card CA.

<Usability>

According to the embodiment described above, the card LF roller 43 is disposed in the card-conveyer path 124 rather than the common conveyer path 125, in which the second reading unit 60 is disposed. With this arrangement, the distance between the card inlet 121 and the card LF roller 43 can be shortened. Therefore, the card CA with the smaller width and length can be inserted to reach the card LF roller 43, where conveyance of the card CA starts, easily. Accordingly, the smaller-sized card CA can be securely conveyed into the card-conveyer path 124.

According to the image reading apparatus 1 described above, the card LF pinch roller 83 and the card LF roller 43 are arranged in the lower positions with respect to the inclined section 33 of the lower housing 13. Therefore, while the sheet SH introduced through the sheet inlet 201 is conveyed over the inclined section 33, the sheet SH being conveyed does not contact the card LF pinch roller 83 or the card LF roller 43. Thus, the sheet SH is not interfered with by the card LF pinch roller 83 or the card LF roller 43, and the conveyance of the sheet SH is prevented from being resisted by the card LF pinch roller 83 or the card LF roller 43. That is, while the card LF pinch roller 83 is pressed against the card LF roller 43 by pressing force provided by a pressing member (not shown), with the sheet SH being kept away from the card LF pinch roller 83 and the card LF roller 43 contactless, the sheet SH is prevented from being affected by the pressing force of the pressing member. Accordingly, skew of the sheet SH can be restricted.

In the image reading apparatus 1 described above, conveying speeds of the sheet SH and the card CA, which are conveyed by driving rollers including the LF roller 42, the card LF roller 43, and the card ejection roller 45, along the front-rear direction depend on the diameters of the rollers and angular velocities of the gears. According to the image reading apparatus 1, the diameters of the LF roller 42, the card LF roller 43, and the card ejection roller 45 are the same. Further, the quantities of the teeth in the first LF roller gear 152, the second LF roller gear 155, the card LF roller gear 159, and the ejection gear 157 are the same. Therefore, the angular velocities of the first LF roller gear 152, the second LF roller gear 155, the card LF roller gear 159, and the ejection gear 157 are the same. Accordingly, the conveying speeds of the sheet SH and the card CA, which are conveyed by driving the LF roller 42, the card LF roller 43, and the card ejection roller 45, along the front-rear direction are equalized to be the same.

In the image reading apparatus 1 described above, the LF roller 42 is located in the rearward position with respect to the CIS unit 62 along the front-rear direction. The card LF roller 43 is located in the rearward position with respect to the LF roller 42 along the front-rear direction. The card ejection roller 45 is located in the frontward position with respect to the LF roller 42 along the front-rear direction.

According to the image reading apparatus 1 described above, the image reading apparatus 1 includes the feed roller 41, which is arranged along the sheet-conveyer path 203 and conveys the sheet SH by the driving force transmitted from the motor 4. The driving force from the motor 4 is transmitted to the rotation shaft 54 via the rotation shaft 53 and to the rotation shaft 51 of the feed roller 41. The motor gear 151 and the feed roller gear 154 are located in the leftward position with respect to the feed roller 41 along the widthwise direction, and the second LF roller gear 155, the card LF roller gear 159, and the ejection gear 157 are located in the rightward position with respect to the feed roller 41 along the widthwise direction. By the feed roller 41, the sheet SH introduced through the sheet inlet 201 can be fed inside the image reading apparatus 1. If the rotation shaft 51 extends rightward from the feed roller 41 and the feed roller gear 154 is located in the rightward position with respect to the feed roller 41, the rotation shaft 51 and the feed roller gear 154 may interfere with the arrangement of the rotation shaft 54 of the card LF roller 43 and the LF roller gear 159. However, with the rotation axis 51 extending leftward from the feed roller 41 and the feed roller gear 154 located in the leftward position with respect to the feed roller 41, interference with the arrangement of the rotation shaft 54 of the card LF roller 43 and the LF roller gear 159 by the rotation shaft 51 and the feed roller gear 154 can be prevented.

According to the image reading apparatus 1 described above, the motor shaft 4S is provided with the motor gear 151, which is meshed with the first LF roller gear 152, and the driving force from the motor 4 is transmitted to the rotation shaft 53 via a transmission path including the motor shaft 4S, the motor gear 151, and the first LF roller gear 152. In this regard, the load for conveying the sheet SH or the card CA is not placed on the transmission path ranging from the motor 4 to the rotation shaft 53. Therefore, the rotation shaft 53 is not affected by uneven rotation, which may be caused by fluctuation of the load to convey the sheet SH or the card CA, and the rotating velocity of the LF roller 42 can be stabilized.

The image reading apparatus 1 described above includes the entry sensor 132, which is disposed in the position between the card LF roller 43 and the second reading unit 60 along the front-rear direction and can detect the card CA. The card LF roller 43 is located in the card-conveyer path 124 rather than the common path 125, in which the second reading unit 60 is disposed. Therefore, compared to arrangement, in which the card LF roller 43 is located in the common conveyer path 125, with the card LF roller 43 being located in the card-conveyer path 124, a longer distance can be reserved between the card LF roller 43 and the second reading unit 60. Accordingly, a mechanical sensor such as the entry sensor 132, which can detect entry of the card CA based on the contact between the card CA and the movable piece 133, can be easily provided in the position between the card LF roller 43 and the second reading unit 60. Thus, by the entry sensor 132, entry of the card CA in the position between the card LF roller 43 and the second reading unit 60 can be detected.

<More Examples>

Although an example of carrying out the disclosure has been described, those skilled in the art will appreciate that there are numerous variations and permutations of the image reading apparatus that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

Figure 6:
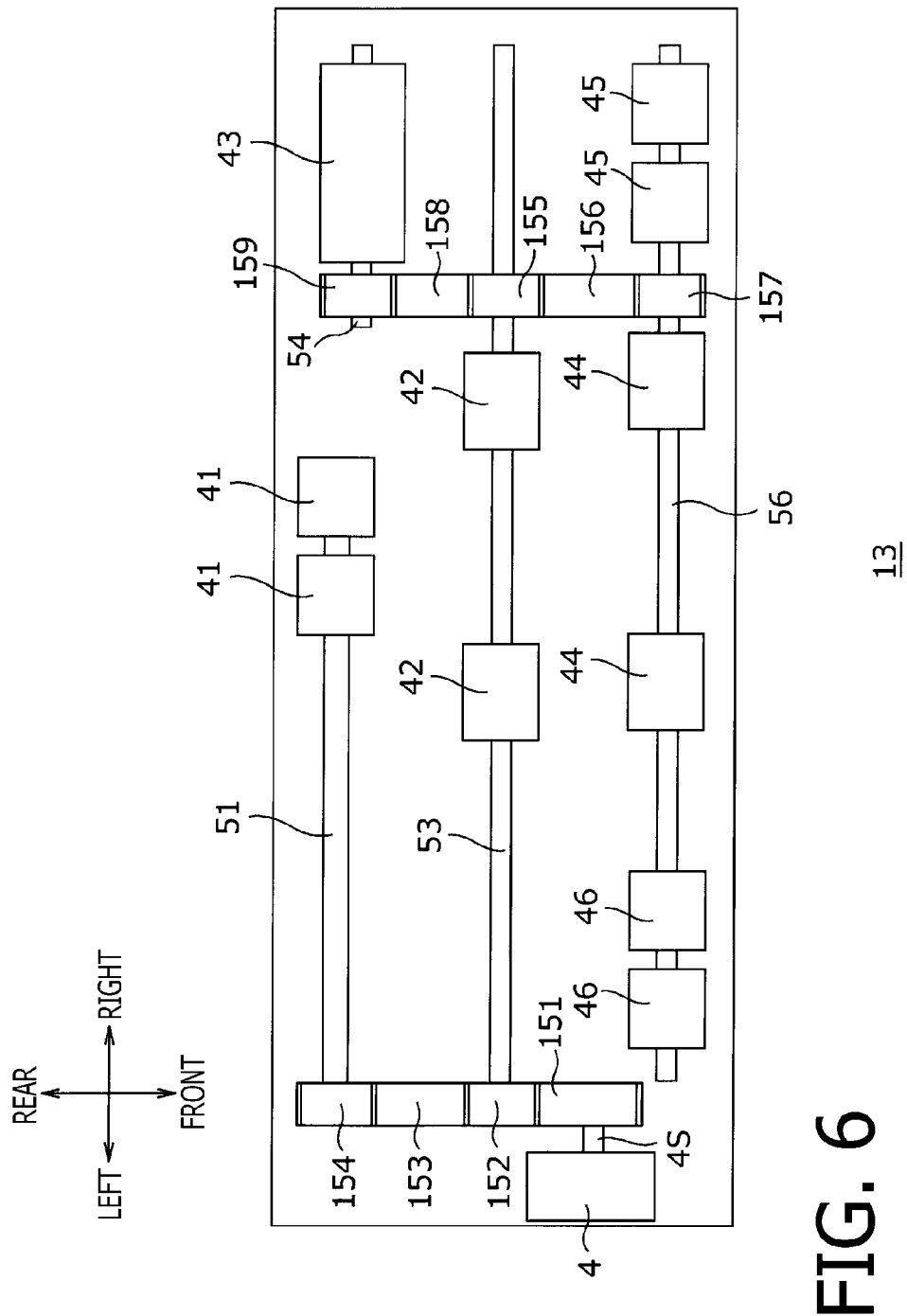
FIG. 6 is a plane view of a driving force transmission mechanism in the image reading apparatus 1 according to another embodiment of the present disclosure.

For example, the configuration represented in FIG. 5 may be replaced with a configuration represented in FIG. 6. In FIG. 6, the second LF roller gear 155 is attached to an intermediate position on the rotation shaft 53 along the widthwise direction in a rightward position with respect to one of the LF roller 42 on the right-hand side. The ejection gear 157 is attached to the rotation shaft 56 in a position between the first ejection roller 44 and the card ejection roller 45. The card LF roller gear 159 is attached to a leftward end of the rotation shaft 54. The second LF roller gear 155, the ejection gear 157, and the card LF roller gear 159 are located in the same widthwise positions. The second transmission gear 156 is located in a position between the second LF roller gear 155 and the ejection gear 157, and the gear teeth of the second transmission gear 156 are meshed with the gear teeth of the second LF roller gear 155 and the gear teeth of the ejection gear 157. The third transmission gear 158 is located in a position between the second LF roller gear 155 and the card LF roller gear 159, and the gear teeth of the third transmission gear 158 are meshed with the gear teeth of the second LF roller gear 155 and the gear teeth of the card LF roller gear 159. With the arrangement shown in FIG. 6, functions achievable by the configuration represented in FIG. 5 can be equally achieved.

In the above example, the lower part of the card outlet 123 coincides with the right-side part of the sheet outlet 202 at the coincident area OL. However, for example, a right-side part of the sheet outlet 202 may coincide with the card outlet 123. In other words, an entirety of the card outlet 123 may be included in the right-side part of the sheet outlet 202.

For another example, the common conveyer path 125 may not necessarily coincide with the right-side part of the sheet-conveyer path 203. A lower part of the common conveyer path 125 may coincide with the right-side part of the sheet-conveyer path 203.

What is claimed is:

1. An image reading apparatus, comprising:
 a housing comprising:
  a first housing;
  a second housing;
  a first opening located in between the first housing and the second housing and formed to extend longitudinally along a first direction;
  a second opening formed to communicate with the first opening through a first path, the first path being located in between the first housing and the second housing; a third opening formed in the second housing, a length of the third opening along the first direction being smaller than a length of the first opening along the first direction;
  a fourth opening formed to communicate with the third opening through a second path, the second path being located inside the second housing, the fourth opening including a part of the second opening; and
  a fifth opening located in a position where a part of the second path and the first path merge with each other;

an image reader disposed in the first path between the second opening and the fifth opening, the image reader extending longitudinally along the first direction;

a first roller exposed to a part of the first path ranging between the image reader and the fifth opening;

a second roller exposed to a part of the second path ranging between the third opening and the fifth opening; and a third roller exposed to a part of the first path ranging between the second opening and the image reader and to a part of the second path ranging between the fourth opening including the part of the second opening and the image reader;

wherein a distance between the rotation axis of the second roller and the rotation axis of the third roller is smaller than 85.60 mm.

2. The image reading apparatus according to claim 1, wherein the second roller is exposed to the part of the second path located inside the second housing.

3. The image reading apparatus according to claim 2, wherein the third opening is formed on one side of the second housing along the first direction;

wherein the second roller is disposed on the one side of the second housing along the first direction; and wherein the first roller is disposed in a position closer to the other side of the second housing along the first direction with respect to the third opening.

4. The image reading apparatus according to claim 1, further comprising:

a motor disposed inside the housing and configured to generate driving force;

a first gear provided to a rotation axis of the first roller;

a second gear provided to a rotation axis of the second roller, the driving force being transmitted to the second gear via the first gear; and a third gear provided to a rotation axis of the third roller, the driving force being transmitted to the third gear via the first gear, wherein the first roller, the second roller, and the third roller are rotatable by the driving force being transmitted from the motor via the first gear; and wherein diameters of the first roller, the second roller, and the third roller are equal to one another, and quantities of teeth of the first gear, the second gear, and the third gear are equal to one another.

5. The image reading apparatus according to claim 4, further comprising:

a fourth roller exposed to a part of the first path closer to the first opening with respect to the first roller, the fourth roller being rotatable by the driving force transmitted from the motor, wherein the third opening is formed on one side of the second housing along the first direction;

wherein the driving force from the motor is transmitted to the rotation axis of the second roller via the rotation axis of the first roller;

wherein the driving force from the motor is transmitted to a rotation axis of the fourth roller via a fourth gear provided to the rotation axis of the fourth roller; and wherein the motor and the fourth gear are disposed on the other side of the second housing along the first direction.

6. The image reading apparatus according to claim 5, further comprising:

a fifth gear provided to a rotation axis of the motor, the fifth gear being meshed with the first gear.

7. The image reading apparatus according to claim 1, further comprising:

a sensor disposed in between the second roller and the image reader protruding into one of a part of the first path within a range corresponding to the length of the third opening along the first direction and a part of the second path, the sensor being configured to output signals by being moved from a protruded position.

8. The image reading apparatus according to claim 1, wherein the first opening is a sheet inlet, the second opening is a sheet outlet, the third opening is a card inlet, the fourth opening is a card outlet, and the fifth opening is card pass-through opening.

9. The image reading apparatus according to claim 8, wherein the third opening is formed on one side of the second housing along the first direction, and the fourth opening is formed on the other side of the second housing along the first direction.

10. The image reading apparatus according to claim 1, wherein the first roller and the second roller are configured to rotate in a same direction.

11. The image reading apparatus according to claim 1, further comprising:

a motor disposed inside the housing and configured to generate a driving force, wherein the second roller is rotatable by the driving force being transmitted from the motor.

12. The image reading apparatus according to claim 11, further comprising:

a first gear provided to a rotation axis of the first roller, wherein the second roller is rotatable by the driving force being transmitted from the motor via the first gear.

13. An image reader apparatus comprising:

an image reader extending longitudinally along a first direction and comprising a first image reader and a second image reader;

a housing comprising a first housing supporting the first image reader and a second housing supporting the second image reader with the second image reader facing to the first image reader, the first housing and the second housing being defining a first conveyance path therebetween, the first conveyance path being ranging between a first inlet and a first outlet;

a tray supported by the housing and movable between an open position and a closed position and configured to expose the first inlet in the open position and to shut the first inlet in the closed position;

a first roller exposed to a part of the first conveyance path ranging between the image reader and a junction point at which the first conveyance path and a second conveyance path are merged with each other, the second conveyance path being ranging between a second inlet and a second outlet;

a second roller exposed to a part of the second path ranging between the second inlet and the junction point, the second inlet being formed in the second housing, a length of the second inlet along the first direction being smaller than a length of the first inlet along the first direction; and a third roller exposed to a part of the first path ranging between the first outlet and the image reader and to a part of the second path ranging between the second outlet including the part of the first outlet and the image reader, wherein a distance between a rotation axis of the second roller and a rotation axis of the third roller is smaller than 85.60 mm.

14. The image reading apparatus according to claim 13, wherein the first roller and the second roller are configured to rotate in a same direction.

15. The image reading apparatus according to claim 13, further comprising:
   a motor disposed inside the housing and configured to generate a driving force, wherein the second roller is rotatable by the driving force being transmitted from the motor.

16. The image reading apparatus according to claim 15, further comprising:
   a first gear provided to a rotation axis of the first roller, wherein the second roller is rotatable by the driving force being transmitted from the motor via the first gear.

17. An image reading apparatus, comprising:
   a housing defining a first path and a second path, the first path having a first portion and a second portion, a portion of the second path being disposed in a lower position with respect to the first portion of the first path, the second path joining the first path at a specific boundary point between the first portion and the second portion of the first path, the first portion of the first path sloping inwardly and downwardly toward the second portion in the housing;
   an image reader disposed in the housing and exposed to the second portion of the first path and to other portion of the second path;
   a first roller disposed to be exposed to the second portion of the first path and the other portion of the second path;
   a second roller disposed in the second path in an opposite position from the first roller across the image reader and across the specific boundary point; and
   a motor disposed inside the housing and configured to generate driving force;
   wherein a quantity of teeth in a gear provided to a rotation axis of the first roller and a quantity of teeth in a gear provided to a rotation axis of the second roller are equal to each other; and
   wherein diameters of the first roller and the second roller are equal to each other.

18. The image reading apparatus according to claim 17, wherein the first roller and the second roller are configured to rotate in a same direction.

19. The image reading apparatus according to claim 17, wherein the second roller is rotatable by the driving force being transmitted from the motor.

20. The image reading apparatus according to claim 17, wherein a distance between a rotation axis of the first roller and a rotation axis of the second roller is smaller than 85.60 mm.

\* \* \* \* \*